(12) United States Patent
Tan et al.

(10) Patent No.: US 12,236,639 B2
(45) Date of Patent: Feb. 25, 2025

(54) 3D OBJECT DETECTION USING RANDOM FORESTS

(71) Applicant: Google LLC, Mountain View, CA (US)

(72) Inventors: David Joseph Tan, Mountain View, CA (US); Federico Tombari, Mountain View, CA (US)

(73) Assignee: Google LLC, Mountain View, CA (US)

( * ) Notice: Subject to any disclaimer, the term of this patent is extended or adjusted under 35 U.S.C. 154(b) by 269 days.

(21) Appl. No.: 17/636,250

(22) PCT Filed: Sep. 13, 2019

(86) PCT No.: PCT/US2019/050918
§ 371 (c)(1),
(2) Date: Feb. 17, 2022

(87) PCT Pub. No.: WO2021/050077
PCT Pub. Date: Mar. 18, 2021

(65) Prior Publication Data
US 2022/0292717 A1     Sep. 15, 2022

(51) Int. Cl.
*G06T 7/50*     (2017.01)
*G06T 7/73*     (2017.01)
(Continued)

(52) U.S. Cl.
CPC .............. *G06T 7/75* (2017.01); *G06T 7/50* (2017.01); *G06V 20/10* (2022.01); *G06V 20/64* (2022.01); *G06T 2207/10028* (2013.01)

(58) Field of Classification Search
CPC ....................................................... G06T 7/73
See application file for complete search history.

(56) References Cited

U.S. PATENT DOCUMENTS

| 9,940,553 B2 | 4/2018 | Shotton et al. |
| 11,521,363 B2 * | 12/2022 | Liang ................... A61B 8/0866 |

(Continued)

FOREIGN PATENT DOCUMENTS

| CN | 111275734 A | * | 6/2020 | ............ G06T 7/251 |
| CN | 110135630 B | * | 2/2022 | ............ G06Q 10/04 |

OTHER PUBLICATIONS

Cong et al., "Speedup 3-D Texture-Less Object Recognition Against Self-Occlusion for Intelligent Manufacturing", IEEE Transactions on Cybernetics, vol. 49, No. 11, Nov. 2019, pp. 3887-3897.
(Continued)

*Primary Examiner* — Di Xiao
(74) *Attorney, Agent, or Firm* — McDonnell Boehnen Hulbert & Berghoff LLP

(57) ABSTRACT

Example embodiments allow for fast, efficient detection and pose estimation of objects based on point clouds, depth images/maps, or other depth information about a scene that may contain the objects. Embodiments include translating and rotating the depth image to bring individual points of the depth image to a standard orientation and location so as to improve performance when an object is near the periphery of the field of view. Some disclosed embodiments include applying a random forest to perform pose estimation. By using the decision trees or other fast methods, it can be advantageous to perform pose estimation a plurality of times prior to identifying whether a particular object is actually present in a scene. Prospective pose estimates can be combined with models of the objects in order to evaluate whether the object is present in the scene.

20 Claims, 8 Drawing Sheets

(51) Int. Cl.
*G06V 20/10* (2022.01)
*G06V 20/64* (2022.01)

(56) References Cited

U.S. PATENT DOCUMENTS

| | | | |
|---|---|---|---|
| 2013/0322767 A1* | 12/2013 | Chao | G06T 7/73 |
| | | | 382/199 |
| 2014/0333722 A1* | 11/2014 | Kim | G06T 7/73 |
| | | | 348/46 |
| 2016/0275686 A1 | 9/2016 | Zach | |
| 2019/0392212 A1* | 12/2019 | Sawhney | G06T 7/70 |

OTHER PUBLICATIONS

Tejani et al., "Latent-Class Hough Forests for 6 DoF Objecft Pose Estimation", IEEE Transactions on Pattern Analysis and Machine Intelligence, vol. 40, No. 1, Feb. 7, 2017, pp. 119-132.
Hinterstoisser et al., "Model Based Training, Detection and Pose Estimation of Texture-Less 3D Objects in Heavily Cluttered Scenes", Nov. 5, 2012, Computer Vision ACCV 2012, Springer Berlin Heidelberg, Berlin, Heidelberg, pp. 548-562.
International Search Report and Written Opinion dated Jun. 2, 2020 for International Application No. PCT/US2019/050918, 15 pages.
Brachmann, E., Krull, A., Michel, F., Gumhold, S., Shotton, J., Rother, C.: "Learning 60 Object Pose Estimation Using 30 Object Coordinates" In: "ECCV 2014. Lecture Notes in Computer Science", 2014, Springer, pp. 536-551, XP047529630, ISBN: 978-3-319-10605-2, vol. 8690.

* cited by examiner

3D OBJECT DETECTION USING RANDOM FORESTS

This application is a U.S. national phase application of International Patent Application no. PCT/US2019/050918 filed on Sep. 13, 2019.

BACKGROUND

It can be beneficial in a variety of environments to detect the presence, location, and orientation of objects in an environment. For example, this information could be used to control a robot or other device to interact with the object (e.g., to pick up the object, to perform a process on the object, to pack the object, to re-orient the object). In another example, this information could be used to provide an overlay image of the object, e.g., as part of an augmented reality system to indicate the location of an object and to instruct a user as to how the user should re-orient the object or otherwise interact with the object. In another example, object detection can help with inventory control, identifying the contents of an environment, navigating an environment, or other tasks.

Information about the presence, location, and/or orientation of an object in an environment can be performed based on a depth image of the environment. Such a depth image could be generated by a time-of-flight camera, a scanned laser rangefinder, two or more cameras arranged to provide stereo image information, or some other sensor(s) configured to provide depth-related information.

SUMMARY

It is desirable in many applications to be able to detect the presence, location, orientation, pose, or other information about objects within an environment based on depth information (e.g., a point cloud, a depth image) about the environment. This could be helpful in navigating the environment, inventorying the contents of the environment, providing educational or entertainment-related overlays of images of the environment, interacting with the object using a robot, performing quality control, or other applications. For example, such information could be used in order to control a robot to grasp or otherwise interact with the object. In another example, such information could be used to provide a graphical overlay or other augmented reality display information to a user (e.g., to instruct the user to interact with the detected object in a particular manner).

However, previous methods for detecting the presence of objects can have unwanted shortcomings. Template matching or other existing methods can be prohibitively computationally expensive. Additionally template matching and other existing methods can perform more poorly when objects are located near the edge of the detected area (e.g., near the edge of a depth image, at a depth from a sensor that is near a maximum depth of the sensor) otherwise far from a preferred region of space (e.g., relative to a depth sensor).

The embodiments described herein provide improved methods for detecting the presence, location, and orientation of objects in an environment based on a depth image or other depth information for the environment. These embodiments generate such determinations in a manner that is improved with respect to speed of the determination, computational cost of the determination, the accuracy of the determination, e.g., in the presence of noise in the depth image.

The embodiments described herein can include translating and/or rotating the depth image or a portion thereof (e.g., a patch surrounding a selected image point of the depth image) to bring a selected point within the depth image to a specified neutral location and/or orientation. This can reduce potential negative effects of the object being located far from a preferred location in space (e.g., relative to the extent of a space described by a depth image). This can also facilitate the application of decision trees or other pose estimation algorithms to the translated and/or rotated points of the depth image.

The embodiments described herein can include performing pose estimation (i.e., determination of the location and orientation) of an object prior to determining whether the object is present. For example, a pose estimation algorithm (e.g., a random forest of regression trees) could be applied to a patch of a depth image (e.g., that has been rotated and/or translated to be centered relative to a specified location/orientation) and used to generate an estimated pose for an object. This estimated pose could then be evaluated to determine whether the object is present. In embodiments where this pose estimation and evaluation process is fast and/or computationally inexpensive (e.g., the process involves applying a random forest of regression trees), it can be preferable to apply the estimation and evaluation process numerous times until a satisfactory pose is discovered than to perform an initial object detection process (e.g., using template matching) followed by pose estimation.

The embodiments described herein also provide improved methods for evaluating an estimated pose. These methods provide improved true positive detection and false negative rejection despite the presence of noise in the depth image (e.g., due to the use of low-cost, small, low-power, or otherwise noisy depth sensors). These evaluation methods include applying multiple evaluation tests with relatively low 'pass' thresholds. For example, an evaluation test could compare the distance between points of a depth image and corresponding points of a model of an object located according to an estimated pose to a threshold distance. Such an evaluation test could return a 'pass' for the estimated pose if more than 50% of the depth image points are less than the threshold distance from the corresponding points on the model. Multiple different evaluation tests could be applied, and the estimated pose validated only if all of the different evaluation tests return a 'pass' for the estimated pose. The use of multiple evaluation tests, each having relatively low 'pass' thresholds, allows even noisy depth data to pass. However, the requirement that multiple different evaluation tests all return a 'pass' allows this overall evaluation method to reject false positives.

Note that the embodiments for patch rotation/translation, pose estimation using random forests, methods for estimated pose evaluation, and object detection and pose estimation by repeated pose estimation and evaluation for a plurality of points in a depth image can be combined, or used individually with alternative algorithms for pose estimation or other aspects of object detection and pose estimation. For example, a patch of points of a depth image could be translated and rotated and applied to a template matching algorithm to generate an estimated pose for an object in an environment. Such a process could be performed subsequent to determining that the object is present in the environment. Alternatively, this rotation and translation, followed by template matching, could be performed a plurality of times and each of the estimated poses could be evaluated in order to determine whether the object is present in the environment and further to select and/or determine a pose for the object. Other combinations of the embodiments described herein are possible.

An aspect of the present disclosure relates to a method including: (i) obtaining a depth image of a scene, wherein the depth image comprises a plurality of image points within a three-dimensional space; (ii) generating a plurality of estimated poses of an object within the three-dimensional space based on a plurality of selected points of the plurality of image points; (iii) performing an evaluation of the plurality of the estimated poses of the object; and (iv) determining a pose for the object within the three-dimensional space based on at least one of the estimated poses of the object and at least one similarity metric determined for the at least one estimated pose. Generating the plurality of estimated poses of the object includes, for each selected point: (a) rotating and translating the plurality of image points such that the selected point is centered within the three-dimensional space; and (b) applying a random forest to the rotated and translated plurality of image points to generate an estimated pose of the object. The evaluation of the plurality of the estimated poses of the object includes, for each estimated pose: (a) translating and rotating a model of the object according to the estimated pose; and (b) comparing the translated and rotated model of the object to the image points of the depth image to determine at least one similarity metric for the estimated pose.

The method may further comprise applying the determined pose for the object by at least one of (i) generating an image of the object, wherein the image of the object includes an overlay based on the determined pose for the object, (ii) providing a command, based on the determined pose for the object, to a robot to interact with the object, or (iii) providing, to a user, a command to manipulate the object such that the object assumes a specified pose. The random forest may comprise a plurality of regression trees. At least one of the regression trees of the plurality of regression trees may generate, as an output, a six-dimensional estimated pose of the object. A first set of input features to a first regression tree of the plurality of regression trees may differ from a second set of input features to a second regression tree of the plurality of regression trees. Rotating and translating the plurality of image points such that the selected point is centered may comprise applying a first rotation and translation to the plurality of image points, and wherein applying the random forest to the rotated and translated plurality of image points to generate the estimated pose of the object comprises: applying the random forest to the rotated and translated plurality of image points to generate a first pose estimate; and applying an inverse of the first rotation and translation to the first pose estimate. Comparing the translated and rotated model of the object to the depth image to determine at least one similarity metric for the estimated pose may comprise: generating three similarity metrics between the translated and rotated model of the object and the depth image; comparing the three similarity metrics to respective threshold values; and determining whether the translated and rotated model of the object corresponds to the depth image by determining whether all three similarity metrics exceeded their respective threshold values. Generating three similarity metrics between the translated and rotated model of the object and the depth image may comprise: generating a first similarity metric by determining a proportion of points on the translated and rotated model that are within a point threshold distance from respective image points of the depth image; generating a second similarity metric by (i) generating a plurality of normal vectors from sets of points on the translated and rotated model, (ii) generating a plurality of normal vectors from sets of image points of the depth image, (iii) generating a plurality of angles between the normal vectors generated from sets of points on the translated and rotated model and corresponding normal vectors generated from sets of image points of the depth image, and (iv) determining a proportion of the angles that are less than a threshold angle; and generating a third similarity metric by determining a proportion of edges of the translated and rotated model that are within an edge threshold distance from respective edges of the depth image. Comparing the translated and rotated model of the object to the depth image to determine at least one similarity metric for the estimated pose may comprise determining whether the translated and rotated model of the object and the depth image are more similar than a threshold degree of similarity, and wherein determining a pose for the object within the three-dimensional space based on at least one of the estimated poses of the object and the at least one similarity metric determined for the at least one estimated pose comprises determining that a particular one of the estimated poses of the object corresponds to a determined similarity metric that is greater than the threshold degree of similarity.

Another aspect of the present disclosure relates to a method including: (i) obtaining a depth image of a scene, wherein the depth image comprises a plurality of image points within a three-dimensional space; (ii) generating a plurality of estimated poses of an object within the three-dimensional space based on a plurality of selected points of the plurality of image points; (iii) performing an evaluation of the plurality of the estimated poses of the object; and (iv) determining a pose for the object within the three-dimensional space based on at least one of the estimated poses of the object and at least one similarity metric determined for the at least one estimated pose. Generating the plurality of estimated poses of the object includes, for each selected point: (a) rotating and translating the plurality of image points such that the selected point is centered within the three-dimensional space; and (b) generating an estimated pose of the object based on the rotated and translated plurality of image points. The evaluation of the plurality of the estimated poses of the object includes, for each estimated pose: (a) translating and rotating a model of the object according to the estimated pose; and (b) comparing the translated and rotated model of the object to the image points of the depth image to determine at least one similarity metric for the estimated pose.

Generating an estimated pose of the object based on the rotated and translated plurality of image points may comprise performing template matching on the rotated and translated plurality of image points. Rotating and translating the plurality of image points such that the selected point is centered may comprise applying a first rotation and translation to the plurality of image points, and wherein generating an estimated pose of the object based on the rotated and translated plurality of image points comprises: using the rotated and translated plurality of image points to generate a first pose estimate; and applying an inverse of the first rotation and translation to the first pose estimate. Comparing the translated and rotated model of the object to the depth image to determine at least one similarity metric for the estimated pose may comprise: generating three similarity metrics between the translated and rotated model of the object and the depth image; comparing the three similarity metrics to respective threshold values; and determining whether the translated and rotated model of the object corresponds to the depth image by determining whether all three similarity metrics exceeded their respective threshold values. Generating three similarity metrics between the translated and rotated model of the object and the depth image may comprise: generating a first similarity metric by determining a proportion of points on the translated and rotated model that are within a point threshold distance from respective image points of the depth image; generating a second similarity metric by (i) generating a plurality of normal vectors from sets of points on the translated and rotated model, (ii) generating a plurality of normal vectors from sets of image points of the depth image, (iii) generating a plurality of angles between the normal vectors generated from sets of points on the translated and rotated model and corresponding normal vectors generated from sets of image points of the depth image, and (iv) determining a proportion of the angles that are less than a threshold angle; and generating a third similarity metric by determining a proportion of edges of the translated and rotated model that are within an edge threshold distance from respective edges of the depth image. Comparing the translated and rotated model of the object to the depth image to determine at least one similarity metric for the estimated pose may comprise determining whether the translated and rotated model of the object and the depth image are more similar than a threshold degree of similarity, and wherein determining a pose for the object within the scene based on at least one of the estimated poses of the object and the at least one similarity metric determined for the at least one estimated pose comprises determining that a particular one of the estimated poses of the object corresponds to a determined similarity metric that is greater than the threshold degree of similarity. The method may further comprise: applying the determined pose for the object by at least one of (i) generating an image of the object, wherein the image of the object includes an overlay based on the determined pose for the object, (ii) providing a command, based on the determined pose for the object, to a robot to interact with the object, or (iii) providing, to a user, a command to manipulate the object such that the object assumes a specified pose.

Yet another aspect of the present disclosure relates to a method including: (i) obtaining a depth image of a scene, wherein the depth image comprises a plurality of image points within a three-dimensional space; (ii) generating a plurality of estimated poses of an object within the three-dimensional space based on a plurality of selected points of the plurality of image points; (iii) performing an evaluation of the plurality of the estimated poses of the object; and (iv) determining a pose for the object within the three-dimensional space based on at least one of the estimated poses of the object and the at least one similarity metric determined for the at least one estimated pose. The evaluation of the plurality of the estimated poses of the object includes, for each estimated pose: (a) translating and rotating a model of the object according to the estimated pose; and (b) comparing the translated and rotated model of the object to the image points of the depth image to determine at least one similarity metric for the estimated pose.

The method may further comprise applying the determined pose for the object by at least one of (i) generating an image of the object, wherein the image of the object includes an overlay based on the determined pose for the object, (ii) providing a command, based on the determined pose for the object, to a robot to interact with the object, or (iii) providing, to a user, a command to manipulate the object such that the object assumes a specified pose. Comparing the translated and rotated model of the object to the depth image to determine at least one similarity metric for the estimated pose may comprise: generating three similarity metrics between the translated and rotated model of the object to the depth image; comparing the three similarity metrics to respective threshold values; and determining whether the translated and rotated model of the object corresponds to the depth image by determining whether all three similarity metrics exceeded their respective threshold values. Generating three similarity metrics between the translated and rotated model of the object to the depth image may comprise: generating a first similarity metric by determining a proportion of points on the translated and rotated model that are within a point threshold distance from respective image points of the depth image; generating a second similarity metric by (i) generating a plurality of normal vectors from sets of points on the translated and rotated model, (ii) generating a plurality of normal vectors from sets of image points of the depth image, (iii) generating a plurality of angles between the normal vectors generated from sets of points on the translated and rotated model and corresponding normal vectors generated from sets of image points of the depth image, and (iv) determining a proportion of the angles that are less than a threshold angle; and generating a third similarity metric by determining a proportion of edges of the translated and rotated model that are within an edge threshold distance from respective edges of the depth image. Comparing the translated and rotated model of the object to the depth image to determine at least one similarity metric for the estimated pose may comprise determining whether the translated and rotated model of the object and the depth image are more similar than a threshold degree of similarity, and wherein determining a pose for the object within the scene based on at least one of the estimated poses of the object and the at least one similarity metric determined for the at least one estimated pose comprises determining that a particular one of the estimated poses corresponds to a determined similarity metric that is greater than the threshold degree of similarity.

Yet another aspect of the present disclosure relates to a method including: (i) obtaining a depth image of a scene, wherein the depth image comprises a plurality of image points within a three-dimensional space; (ii) applying a random forest to the plurality of image points to generate an estimated pose of an object in the three-dimensional space; and (iii) determining that the object is present in the three-dimensional space by: (a) translating and rotating a model of the object according to the estimated pose; and (b) determining that the translated and rotated model of the object and the image points of the depth image are more similar than a threshold degree of similarity.

The method may further comprise: applying the determined pose for the object by at least one of (i) generating an image of the object, wherein the image of the object includes an overlay based on the determined pose for the object, (ii) providing a command, based on the determined pose for the object, to a robot to interact with the object, or (iii) providing, to a user, a command to manipulate the object such that the object assumes a specified pose. The random forest may comprise a plurality of regression trees. At least one of the regression trees of the plurality of regression trees may generate, as an output, a six-dimensional estimated pose of the object. A first set of input features to a first regression tree of the plurality of regression trees may differ from a second set of input features to a second regression tree of the plurality of regression trees. Determining that the translated and rotated model of the object and the depth image are more similar than a threshold degree of similarity may comprise: generating three similarity metrics between the translated and rotated model of the object and the depth image; comparing the three similarity metrics to respective threshold values; and determining that all three similarity metrics exceed their respective threshold values. Generating three similarity metrics between the translated and rotated model of the object and the depth image may comprise: generating a first similarity metric by determining a proportion of points on the translated and rotated model that are within a point threshold distance from respective image points of the depth image; generating a second similarity metric by (i) generating a plurality of normal vectors from sets of points on the translated and rotated model, (ii) generating a plurality of normal vectors from sets of image points of the depth image, (iii) generating a plurality of angles between the normal vectors generated from sets of points on the translated and rotated model and corresponding normal vectors generated from sets of image points of the depth image, and (iv) determining a proportion of the angles that are less than a threshold angle; and generating a third similarity metric by determining a proportion of edges of the translated and rotated model that are within an edge threshold distance from respective edges of the depth image.

Yet another aspect of the present disclosure relates to a method comprising: obtaining a depth image of a scene, wherein the depth image comprises a plurality of image points within a three-dimensional space; generating an estimated pose of an object in the three-dimensional space; translating and rotating a model of the object according to the estimated pose; and comparing the translated and rotated model of the object to the image points of the depth image to determine at least one similarity metric for the estimated pose; and determining an estimated pose for the object in the three-dimensional space based upon the at least one similarity metric for the estimated pose.

Determining an estimated pose for the object in the three-dimensional space may comprise determining that the object is present in the three dimensional space. Generating an estimated pose of an object in the three-dimensional space may comprise applying a random forest to the plurality of image points. Determining that the estimated pose corresponds to the object in the three-dimensional space based upon the at least one similarity metric for the estimated pose may comprise determining that the translated and rotated model of the object and the image points of the depth image are more similar than a threshold degree of similarity. Generating an estimated pose of an object in the three-dimensional space may comprise generating a plurality of estimated poses of the object within the three-dimensional space based on a plurality of selected points of the plurality of image points; wherein determining an estimated pose for the object in the three-dimensional space based upon the at least one similarity metric for the estimated pose comprises: performing an evaluation of the plurality of the estimated poses of the object, wherein the evaluation comprises, for each estimated pose: translating and rotating a model of the object according to the estimated pose; and comparing the translated and rotated model of the object to the image points of the depth image to determine at least one similarity metric for the estimated pose; and determining a pose for the object within the three-dimensional space based on at least one of the estimated poses of the object and the at least one similarity metric determined for the at least one estimated pose. Generating the plurality of estimated poses of the object may comprise, for each selected point: rotating and translating the plurality of image points such that the selected point is centered within the three-dimensional space; and generating an estimated pose of the object based on the rotated and translated plurality of image points. Generating an estimated pose of the object based on the rotated and translated plurality of image points may comprise applying a random forest to the rotated and translated plurality of image points.

For the avoidance of doubt, the term "pose" is used to denote an estimated or known location and orientation of an object. Pose can be determined absolutely (e.g., relative to an absolute coordinate system) or relatively (e.g., relative to a depth sensor that generates depth information from which a pose is estimated).

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
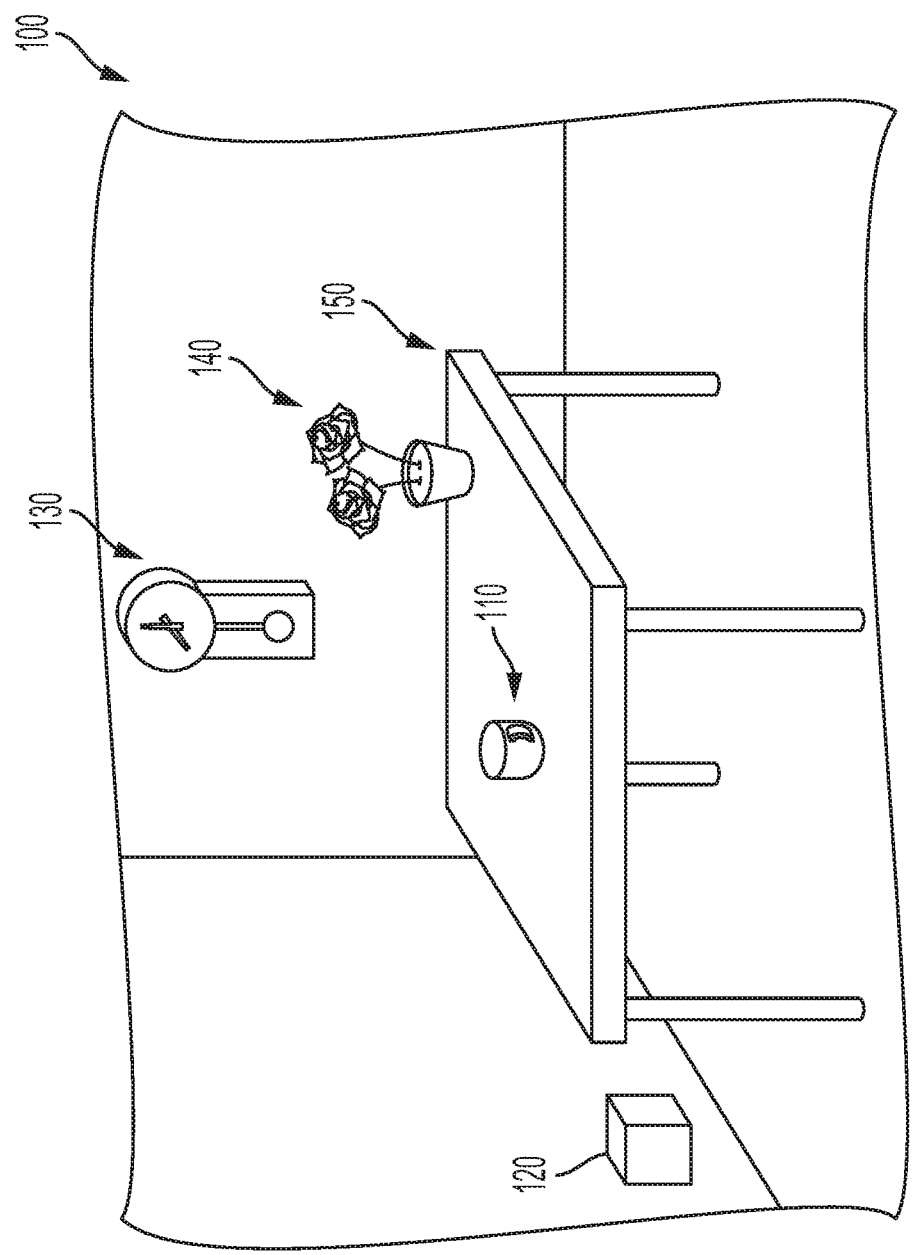
FIG. 1 depicts contents of an example scene.

Examples of methods and systems are described herein. It should be understood that the words "exemplary," "example," and "illustrative," are used herein to mean "serving as an example, instance, or illustration," Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

A variety of methods are available for object detection and pose estimation (i.e., the estimation of the location and orientation of an object) based on point clouds, depth images, or other depth information about an environment that may include an object of interest. Detection and/or pose estimation of objects can facilitate a variety of applications in robotics, virtual reality, augmented reality, inventory management, education, or other applications.

Object detection and/or pose estimation may be performed in order to control the operation of a robot. This could include providing commands to control the robot to navigate through the environment while avoiding the object, coming within a specified distance of the object, assuming a particular location, orientation, and/or configuration relative to the object, or to otherwise move through an environment in a specified manner relative to the location and/or orientation of the object. Controlling a robot could include providing commands to the robot to collect the object, to repair the object, to re-orient the object, to use the object to perform a repair or other action, to manipulate or otherwise interact with the object, or to perform some other activity related to the object.

Object detection and/or pose estimation may be performed in order to determine a number, type, or other information about objects in an environment. For example, the presence and/or pose of objects in a crate, in an assembly line output hopper or on a conveyor belt, on a counter of a customer service desk, or in some other environment could be determined in order to determine how many of the objects are present, how many of a number of different types of object are present, or other information about the quantity and identity of objects in the environment.

Object detection and/or pose estimation may be performed in order to provide information for a virtual reality and/or augmented reality environment. This could include generating an image of a detected object along with an overlay based on the detected pose of the object. For example, such an overlay could include an outline of the object, a wireframe of a model of the object, a graphical indication of the identity, location, and/or orientation of the object and/or features of the object, a textual indication of the identity, location, and/or orientation of the object, or some other overlay information related to the detected presence and/or pose of the object in an environment. Such a graphical overlay and/or image could be provided via a display that allows a user to see the environment through the display. For example, the display could be mounted on a head-mounted device such that a wearer can see the object through the display and can also view, via the display, an overlay that appears, to the wearer, atop the object or at some other location relative to the object in the wearer's field of view.

In some examples, the estimated pose of the object could be used to provide, to a user, a command to manipulate the object in a specified manner. This could include providing a command to manipulate the object such that the object's orientation and/or location matches a specified orientation. Such a command could be provided in order to instruct the user how to repair an apparatus (e.g., by adding and/or removing the object to/from the apparatus, by correcting the location and/or orientation of the object within the apparatus), to configure an apparatus (e.g., by adjusting the orientation of the object within and/or relative to the apparatus), or to instruct the user to take some other action relative to one or more identified objects. For example, the object could be a replacement component (e.g., an oil filter) of a vehicle, and the command could be a command to change the location and orientation of the replacement component to install the replacement component in the vehicle (e.g., to align the oil filter with a corresponding port on an engine of the vehicle).

FIG. 1 illustrates an example environment 100 that contains a target object 110 (a coffee mug) and a device 120 that is capable of generating depth information for the environment 100. Such a device could be a camera, a smartphone, an element of an augmented reality system (e.g., a head-mounted-display that includes a depth sensor), a robot, a drone, or some other system that is capable of generating depth information for an environment of the device. The environment 100 also includes a table 150, a clock 130, and a pot of flowers 140.

The device 120 could include a variety of components configured to provide depth information for the environment 100. Such components could include multiple cameras (e.g., infrared cameras, visible light cameras) configured to provide stereo image information. Such stereo image information could then be used to generate depth information for the environment 100 by determining correspondences between features of multiple different images within the stereo image information of via some other process. Depth-sensitive components could include a time-of-flight camera configured to determine, for each pixel of the time-of-flight camera, an amount of time it takes for illumination to travel from an emitter of the device 120 to respective portions of the environment 100 and back to the device 120. Depth-sensitive components could include ultrasonic rangefinders or other acoustical components configured to provide depth information.

Depth-sensitive components could include one or more light emitters configured to illuminate the environment 100 in a specified manner in order to facilitate generation of depth information for the environment 100. Such components could include one or more emitters of grids, lines, or other structures patterns of visible or invisible (e.g., infrared) illumination. A camera could then image the illuminated environment and the images used to generate depth information for the environment 100, e.g., by using a triangulation method, by determining an apparent deformation of the pattern of illumination, and/or by using some other method. Additionally or alternatively, the direction of illumination emitted from the device 120 could be scanned over the environment 100 over time in order to generated depth information. For example, the device 120 could include one or more lasers configured to emit points of illumination, and a galvanometer or other component of the device 120 could operate to scan the point of illumination across the environment 100 over time. Illumination reflected from environment 100 could then be detected and used to generate depth information for the environment 100. This could include applying a triangulation method to images taken of the environment 100, operating a laser rangefinder to determine depth information based on a detected time taken by the illumination to illuminate the environment 100 and be reflected back to the device 120, or using some other method.

Depth information generated by the device 120 can include, or be used to generate, a depth image for the environment 100. Such a depth image includes a plurality of image points within a three-dimensional space that spans the environment 100. The three-dimensional space could be defined relative to the device 120. The plurality of points could be regularly spaced across the three-dimensional space. For example, the plurality of points could be regularly spaced with respect to angle relative to the device 120 across a range of horizontal and vertical angles. The plurality of points could correspond to respective elements of a depth sensor used to generate the plurality of points, e.g., each point in the plurality of points could be determined based on the output of a respective pixel of a time-of-flight camera. Additionally or alternatively, the plurality of points could be derived from some other depth information generated for the environment 100. For example, a point cloud could be generated for the environment by scanning a laser rangefinder across the environment. The image points of the depth image could be determined from the points of the point cloud, e.g., by interpolating the points of the point cloud onto a regularly-spaced set of angles relative to the device 120.

Figure 2:
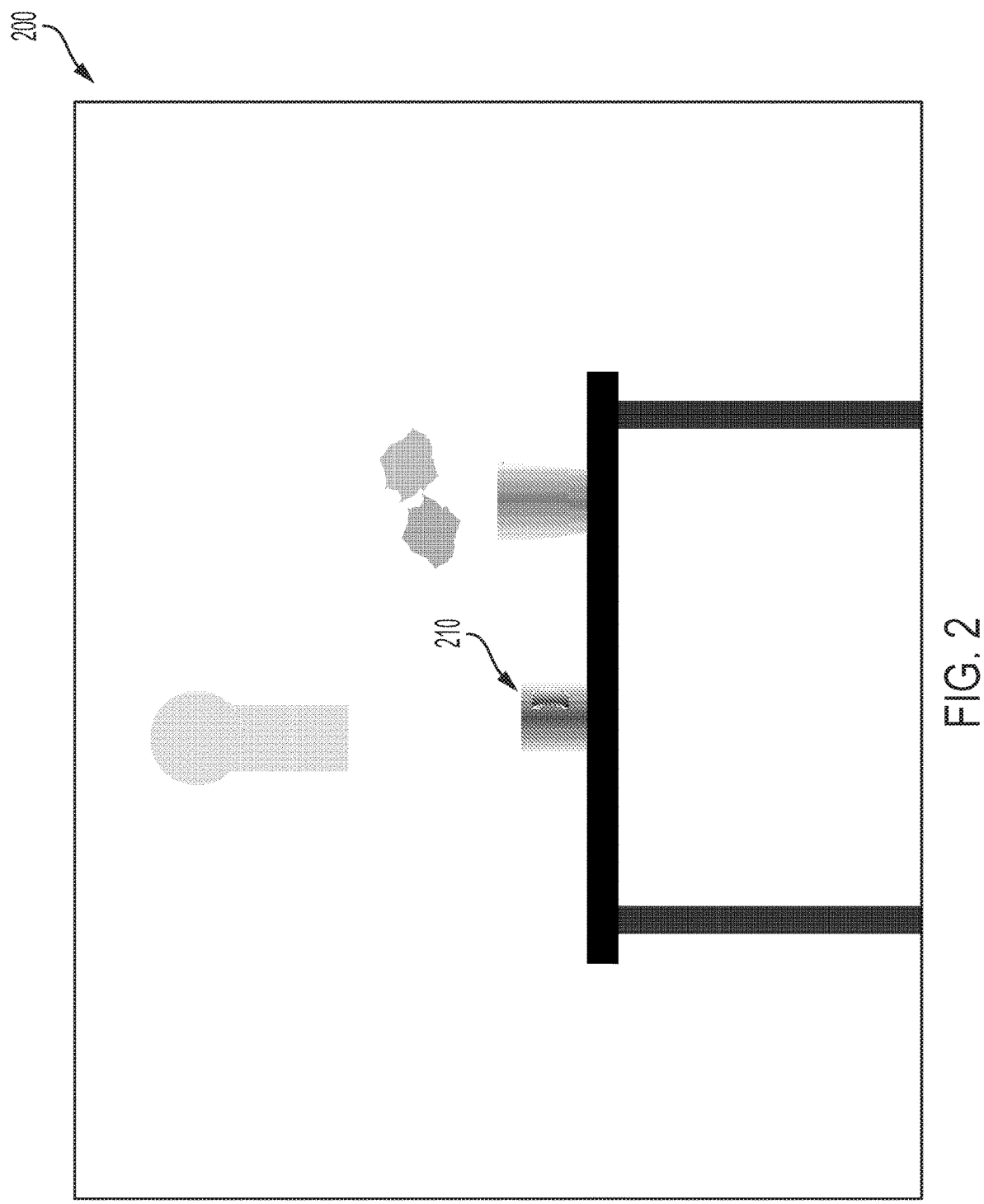
FIG. 2 depicts an example depth image.

FIG. 200 illustrates an example of such a depth image 200 generated for the environment 100 of FIG. 1. As shown in FIG. 2, darker shading corresponds to portions of the depth image that are closer to the device 120, Accordingly, the portions (e.g., image points) of the depth image 200 corresponding to the top and legs of the table 150, being closest to the device 120, are darkest, while the portions corresponding to the clock 130, being farther away from the device 120, are lighter. An illustrated portion 210 corresponds to the object 110 from FIG. 1.

Detecting the presence, location, and/or orientation of objects (e.g., object 110) based on depths images or other depth information for an environment can be difficult and computationally expensive. Some methods (e.g., template matching) can be computationally expensive and may perform more poorly when the object is occluded by other objects, is located away from a central region of the depth image, has an orientation that is substantially different from a default orientation, or under other circumstances.

A variety of embodiments are provided herein to address these shortcomings and to reduce the computational cost and latency associated with detecting objects within depth images and/or estimating the pose of such objects. These embodiments generate such determinations in a manner that may be improved, relative to previously existing methods, with respect to speed of the determination, computational cost of the determination, the accuracy of the determination, e.g., in the presence of noise in the depth image.

The embodiments described herein can include translating and/or rotating the depth image or a portion thereof (e.g., a portion 210 of the depth image 200 that corresponds to the object 110) to bring a selected image point within the depth image to a specified neutral location and/or orientation. This can reduce potential negative effects of the object being located far from a preferred location in space (e.g., relative to the extent of a space described by a depth image). This can also facilitate the application of decision trees or other pose estimation algorithms to the translated and/or rotated points of the depth image.

The embodiments described herein can include performing pose estimation (i.e., determination of the location and orientation) of an object prior to determining whether the object is present. For example, a pose estimation algorithm (e.g., a random forest of regression trees) could be applied to a patch of a depth image (e.g., that has been rotated and/or translated to be centered relative to a specified location/orientation) and used to generate an estimated pose for an object. This estimated pose could then be evaluate to determine whether the object is present. In embodiments where this pose estimation and evaluation process is fast and/or computationally inexpensive (e.g., where the process involves applying a random forest of regression trees), it can preferable to apply the estimation and evaluation process numerous times until a satisfactory pose is discovered than to perform an initial object detection process (e.g., using template matching) followed by pose estimation.

The embodiments described herein also provide improved methods for evaluating an estimated pose and/or determining, based on an estimated pose, that the object is represented by the depth image. These methods improve object detection and pose estimation performance despite the presence of noise in the depth image (e.g., due to the use of low-cost, small, low-power, or otherwise noisy depth sensors). These evaluation methods include applying multiple evaluation tests with relatively low 'pass' thresholds. For example, a particular evaluation test could compare the distance between points of a depth image and corresponding points of a model of an object located according to an estimated pose to a threshold distance. Such an evaluation test could return a 'pass' for the estimated pose if more than 50% of the depth image points are less than the threshold distance from the corresponding points on the model. Multiple different evaluation tests could be applied, and the estimated pose validated only if all of the different evaluation tests return a 'pass' for the estimated pose. The use of multiple evaluation tests, each having relatively low 'pass' thresholds, allows even noisy depth data to pass one or more individual evaluation tests. However, the requirement that multiple different evaluation tests all return a 'pass' enables this overall evaluation method to reject false positives.

Note that the embodiments disclosed herein for patch rotation/translation, pose estimation using random forests, methods for estimated pose evaluation, and object detection and pose estimation by repeated pose estimation and evaluation for a plurality of points in a depth image can be combined, or used individually with alternative algorithms for pose estimation or other aspects of object detection and pose estimation. For example, a patch of points of a depth image could be translated and rotated and applied to a template matching algorithm to generate an estimated pose for an object in an environment. Such a process could be perforated subsequent to determining that the object is present in the environment. Alternatively, this rotation and translation, followed by template matching, could be performed a plurality of times and each of the estimated poses could be evaluated in order to determine whether the object is present in the environment and further to select and/or determine a pose for the object. Other combinations of the embodiments described herein are possible.

II. EXAMPLE POSE ESTIMATION BY TRANSLATING AND ROTATING POINTS OF A DEPTH IMAGE

As noted above, certain pose estimation and/or object detection methods (e.g., template matching) may exhibit difficulty when provided with depth information in cases where the object is not located and/or oriented near a 'default' location/orientation (e.g., near the center of the depth image). Embodiments disclosed herein provide a solution by selecting an image point within the depth image and translating and rotating the depth image such that the selected image point is centered. This can include translating and/or rotating some or all of the image points of the depth image such that the selected image point is located at a specified location within a three-dimensional space and/or such that the orientation of the selected image point (e.g., relative to nearby image points of the depth image) corresponds to a specified orientation. The translated and rotated image points can then be applied to a template matching algorithm, one or more regression trees (e.g., a random forest of regression trees), or some other pose estimation and/or object detection algorithms.

This method can be advantageous as a pre-processing step for pose estimation algorithms that are configured to accept depth information having certain specified characteristics (e.g., a mean location that is at or near a zero point) and/or that have been trained on training examples that are location at a center location in three-dimensional space.

For a particular selected image point, all of the image points of the depth image could be translated and rotated and applied to the pose estimation algorithm. Alternatively, a subset of the image points (e.g., a set of image points within a specified maximum distance from the selected image point) could be translated and rotated and applied to the pose estimation algorithm.

Figure 3A:
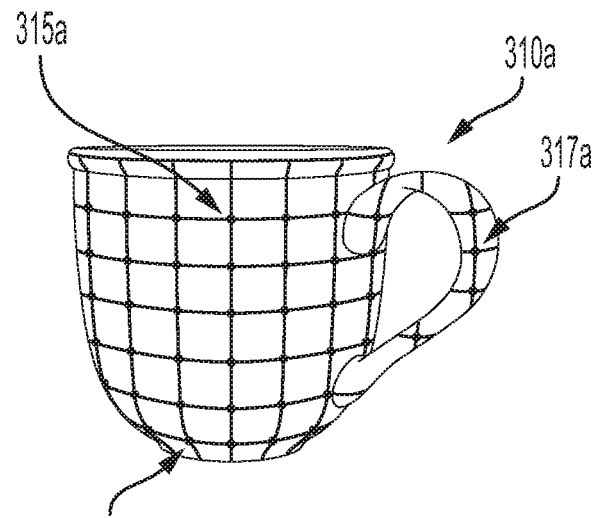
FIG. 3A depicts image points of the example depth image of FIG. 2.

FIG. 3A shows an example patch 310a (illustrated in FIG. 3A as black dots) of image points of the depth image 200 of FIG. 2. The patch 310a includes image points corresponding to the object 110 in the environment. The outline of the object 110 and a grid of lines connecting the image points of the patch are provided in FIG. 3A for ease of viewing the relationship between the three-dimensional locations of the image points of the patch 310a and the shape of the object 110.

Such a patch 310a could be identified, from the image points of the depth image 200, by identifying those image points of the depth image that have three-dimensional locations within a specified distance from a selected image point (e.g., one of the selected image points 315a, 317a, 319a illustrated in FIG. 3A), by identifying image points of the depth image that have indexes within a specified range of indexes of a selected image point (e.g., that are, within the depth image, within a specified horizontal and/or vertical distance from the selected image point), by identifying image points that are within a specified graph distance from a selected image point (in embodiments wherein the image points are connected to each other via a grid, mesh, or other graph), or by identifying a set of image points via some other method.

Figure 3B:
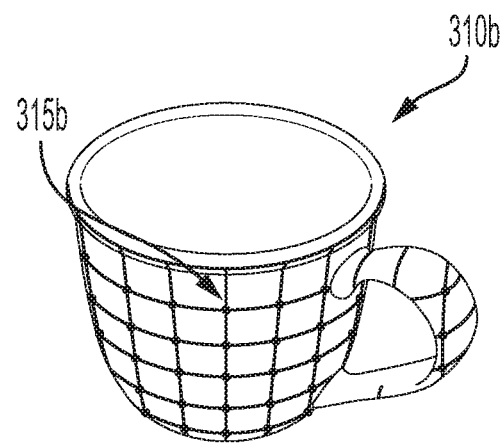
FIG. 3B depicts image points of the example depth image of FIG. 2, having been rotated and translated.
Figure 3C:
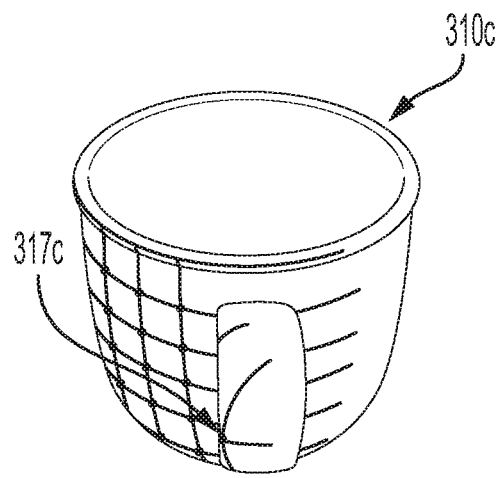
FIG. 3C depicts image points of the example depth image of FIG. 2, having been rotated and translated.
Figure 3D:
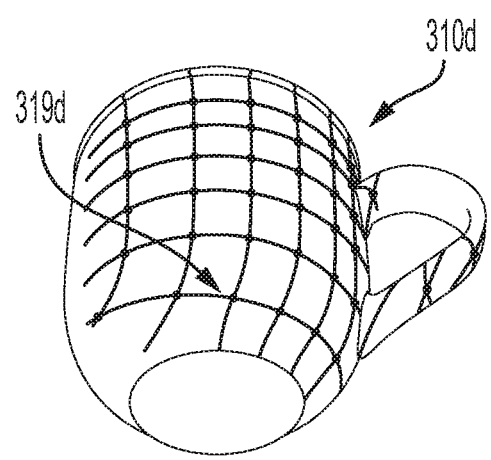
FIG. 3D depicts image points of the example depth image of FIG. 2, having been rotated and translated.

FIGS. 3B, 3C, and 3D illustrate example translations and rotations of the patch 310a of image points such that selected image points 315a, 317a, 319a, respectively, are centered. FIG. 3B shows a first translated and rotated patch 310b of image points that includes a first centered image point 315b that is centered within the three-dimensional space of the depth image and that corresponds to the first selected image point 315a. FIG. 3C shows a second translated and rotated patch 310c of image points that includes a second centered image point 317c that is centered within the three-dimensional space of the depth image and that corresponds to the second selected image point 317a. FIG. 3D shows a third translated and rotated patch 310d of image points that includes a third centered image point 319d that is centered within the three-dimensional space of the depth image and that corresponds to the third selected image point 319a.

Translating and rotating some (e.g., a patch) or all of the image points of depth image such that a selected image point is centered can include applying a translation and rotation of the image points of the depth image to move the selected image point to a specified location in three-dimensional space (e.g., a zero point). Alternatively, the translation and rotation could be applied to the image points of the depth image such that an average location of a patch of image points (e.g., a patch proximate to the selected image point) corresponds to a specified location in three-dimensional space (e.g., a zero point).

Translating and rotating some (e.g., a patch) or all of the image points of depth image such that a selected image point is centered can include applying a translation and rotation of the image points of the depth image such that the selected image point has a specified orientation in three-dimensional space. This can include determining a normal vector from the selected image point and two or more additional image points, and rotating the image points of the depth image such that this normal vector has a specified orientation in three-dimensional space (e.g., a zero vector, a vector parallel to one of the axes of the three-dimensional space). The two or more additional image points could be a set of the image points that are closest to the selected image points, a set of the image points that are adjacent to the selected image point in some manner (e.g., that are immediate neighbors to the selected image point vertically and horizontally in the depth image, that are connected to the selected image point via a grid, mesh, or other graph of connections between the image points). Alternatively, the normal vector could be an average normal of a patch of image points of the depth image.

The translated and rotated set of image points (e.g., all of the image points of a depth image, a patch or other subset of the image points of the depth image) can then be applied to a template matching algorithm, an artificial neural network, one or more decision trees or regression trees (e.g., a random forest of regression trees), or some other pose estimation algorithm. An inverse of the translation and rotation applied to the set of image points could then be applied to a pose estimate generated by such a process, so as to generate an estimate of the pose of the object within the environment represented by the depth image.

III. EXAMPLE POSE ESTIMATION BY APPLICATION OF DECISION TREES

One or more decision trees and/or regressions trees can be advantageously applied to estimate a pose for an object based on a portion of a depth image that represents the object. This is especially the case when the portion of the depth image has been translated and rotated to center the portion of the depth image in a three-dimensional space. Collections of decision trees and/or regression trees (e.g., random forests) also have the benefit of being very computationally inexpensive to execute, allowing for reduced computational budgets, reduced power budgets, increased effective 'frame rates' for object detection and/or pose estimation, or other benefits. This computational efficiency and/or speed can enable new applications in object detection and/or pose estimation. For example, a random forest could be applied to perform repeated pose estimation for different portions of a depth image, followed by evaluation of the estimated poses to determine whether any of the portions of the depth image represents an object of interest. This method differs from traditional object detection, which begins with object detection followed by pose estimation.

A decision tree receives a plurality of input features and outputs a classification, selected from an enumerated set of possible classes, based on the input features. Each output class could be, e.g., a six-dimensional pose estimate for an object, or some other information related to the pose of an object. A regression tree receives a plurality of input features and outputs a continuous-valued output based on the input features. Each output of a regression tree could be vector-valued or otherwise multi-dimensional, e.g., a six-dimensional pose estimate for an object, or some other information related to the pose of an object. The input features may be continuous-valued numbers, classification values, or other types of input. A decision or regression tree operates to generate an output by traversing a branching tree of decisions, each decision comparing an input value to a threshold value (e.g., is a first particular input image point less than a first threshold distance from an origin location). The result of a particular decision may lead to another decision (e.g., is a second particular input image point less than a second threshold distance, along a specified axis, from an origin plane perpendicular to the specified axis), or to an output (e.g., a particular estimated pose, or an estimated location, orientation, or other component of an estimated pose).

The input features to the regression and/or decision tree(s) could be aspects of individual image points of a depth image (e.g., of image points that have been translated and/or rotated as described above to center a particular image point of the depth image), For example, the input features could be individual coordinates of the input points in three-dimensional space, a location of the image points along a specified axis and/or projected onto a specified plane, a distance between the image points and a specified location in three-dimensional space (e.g., from an origin point), or some other aspect determined from one or more image points. Additionally or alternatively, the input features could be aspects of image points derived from the image points of the depth image, e.g., interpolated image points generated from the image points of the depth image.

A plurality of regression trees, organized in a random forest, could be used to estimate poses from input image points. Each regression tree could output a full six-dimensional estimated pose for an object, or could output a subset of the dimensions of an estimated pose for an object (e.g., a three-dimensional orientation, a three-dimensional translation). The output of such a random forest can be determined based on the mean, or on some other average, of the determined outputs of the regression trees of the random forest. Where all of the input features for a particular regression tree are unavailable (e.g., due to the input image points representing an edge or occlusion within the depth image), the output of that particular regression tree can be omitted.

Each of the regression trees of the random forest could be trained on a respective different subset of a set of training data (e.g., a respective set of input features determined from corresponding simulated object poses). To further increase the robustness of the poses predicted by the random forest, the regression trees of the random forest could vary with respect to their input features (e.g., with respect to the set of image points that are provided as input to the different regression trees). This configuration of random forest can allow for less-determinative features to be selected—for in a subset of the regression trees, such that these less-determinative features can contribute to more accurate pose estimation in cases where those less-determinative features contain useful information regarding object pose.

Training data for the decision and/or regression trees can come from a variety of sources. In some examples, a model of an object of interest could be used to simulate image points of a depth image when the object is oriented according to a variety of different locations and orientations. These simulated image points, along with the corresponding ground-truth pose information (location and orientation), can form training data for the decision trees, regression trees, and/or random forest.

IV. EXAMPLE POSE EVALUATION

In order to determine the pose of an object that is represented in a depth image, an object detection algorithm (e.g., template matching) can be applied to determine that the object is present, followed by pose estimation. However, traditional pose object detection algorithms can be computationally expensive. If efficient, fast pose estimation and estimated pose evaluation algorithms are available, it can be preferable to perform pose estimation and evaluation a plurality of times, based on different portions of a depth image, in order to efficiently determine the presence and pose of the object in the depth image. For example, the pose of the object could be determined based on one or more of the estimated poses that, via an evaluation process, resulted in a supra-threshold similarity between the depth image and an appropriately-posed model of the object. Such fast, efficient pose estimation algorithms include the application of a random forest to rotated and translated portions of the depth image, as described above.

A particular estimated pose for an object can be evaluated against a depth image in a variety of ways. Such evaluations can include determining at least one similarity metric between a portion of the depth image (e.g., a location and shape of image points of the depth map proximate to the estimated location of the object within the depth image) and a model of the object located and oriented according to the estimated pose within the three-dimensional space of the depth image. Such a similarity metric could be binary-valued ("similar" vs. "non-similar") or continuous-valued.

One or more such similarity metrics could be used to determine whether the translated and rotated model of the object and the depth image are more similar than a threshold degree of similarity. The pose for the object in the depth image and/or a determination that the object is represented in the depth image could then be determined based on one or more estimated poses whose corresponding similarity metric is greater than the threshold degree of similarity. This could include generating estimated poses and corresponding similarity metrics based on the depth image until one of the estimated poses results in a similarity that is greater than the threshold degree of similarity. In another example, estimated poses and corresponding similarity metrics based on the depth image could be generated until a threshold number of such sufficiently similar estimated poses are generated, and the pose for the object in the depth image could be determined as a mean or other average of the sufficiently similar estimated poses. In yet another example, a set amount (e.g., number, density) of estimated poses and corresponding similarity metrics based on the depth image could be generated, and the pose for the object in the depth image could be determined as a mean or other average of the sufficiently similar estimated poses.

Similarity metrics, between image points of a depth image and a model of an object that has been translated and rotated according to an estimated pose, could be determined in a variety of ways. The similarity metrics could be determined based on the proximity between image points on the depth map and points on the model of the object, occlusion of points of the model by image points of the depth image, an angle between surface normal of the model and surface normals of the depth image, proximity between edges of the model and edges of the depth image, or a comparison between some other property or aspect of the translated and rotated model of the object and image points of the depth image.

A similarity metric could be determined by determining a distance between image points of the depth image and associated points on the translated and rotated model of the object. The association between the image points and points on the model could be determined by back-projecting the image points of the depth image, e.g., relative to the location of a depth sensor used to generate the depth image. The similarity metric could be determined based on a proportion of the distances that are less than a threshold distance. In another example, the similarity metric could be based on a proportion of the distances that are less than a threshold distance and that correspond to depth image points that do not occlude their respective model points (i.e., are not disposed between their respective model point and the location, in the three-dimensional space of the depth image, that corresponds to the location of the depth sensor that generated the depth information represented in the depth image).

A similarity metric could be determined by determining the angles between normal vectors on the surface of the depth image and corresponding normal vectors on the translated and rotated model of the object. Normal vectors could be determined for the depth image by selecting triplets of image points on the depth image (e.g., image points that are proximate to each other, image points that are adjacent to each other along a mesh, graph, pixel indexing scheme, or other connection within the depth image) and determining the normal vector of a plane passing through the triplet of image points. Corresponding normal vectors could be determined for the rotated and translated model by projecting the selected triplet of image points onto the model and determining the normal vector of a plane passing through the triplet of projected points on the model. The similarity metric could be determined based on a proportion of the pairs of normal vectors that differ from each other by less than a threshold angle. In another example, the similarity metric could be based on a proportion of the pairs of normal vectors that differ from each other by less than a threshold angle and that correspond to depth image points that do not occlude their respective model points (i.e., are not disposed between their respective model point and the location, in the three-dimensional space of the depth image, that corresponds to the location of the depth sensor that generated the depth information represented in the depth image).

A similarity metric could be determined by determining a distance between edges of the depth image (e.g., edges connecting pairs of image points of the depth image) and associated points and/or edges on the translated and rotated model of the object. The association between the edges of the depth image and points/edges on the model could be determined by back-projecting the image points of each edge of the depth image onto the model, e.g., relative to the location of a depth sensor used to generate the depth image. The similarity metric could be determined based on a proportion of the edges that are less than a threshold distance from one or both of the corresponding projected points on the model. In another example, the similarity metric could be based on a proportion of the edge that are less than a threshold distance from one or both of the corresponding projected points on the model and that correspond to depth image points that do not occlude their respective model points (i.e., are not disposed between their respective model point and the location, in the three-dimensional space of the depth image, that corresponds to the location of the depth sensor that generated the depth information represented in the depth image).

The depth image may contain noise. Is such a scenario, it can be difficult to apply the above similarity metrics in a manner that can detect pose estimates that correctly approximate the true pose of an object while rejecting pose estimates that do not. To compensate for noise, multiple different similarity metrics can be generated for a particular pose estimate. These individual similarity metrics could be compared to relatively lax similarity thresholds, in order to reduce the likelihood of rejecting a sufficiently correct pose estimate. To reduce the likelihood of accepting an incorrect pose estimate, it could be required that a pose estimate result in multiple supra-threshold similarity metrics. For example, a particular pose estimate could only be retained (e.g., used as the predicted pose estimate for an object, or averaged or otherwise combined with several other retained pose estimates) if it results in at least three similarity metrics that are greater than respective threshold values. This could include determining only three similarity metrics, in which case all three metrics would need to exceed their respective threshold values. Alternatively, more than three similarity metrics could be determined. More or fewer similarity metrics could be determined, and more or fewer than three of the determined similarity metrics could be required to be supra-threshold in order to retain the pose estimate in determining the pose of an object.

In an example, three similarity metrics could be determined between the translated and rotated model of the object and the depth image. Generating the first similarity metric includes determining a proportion of points on the translated and rotated model that are within a point threshold distance from respective image points of the depth image. Determining the first similarity metric could additionally include rejecting, from the determined proportion, those image points that occlude their respective point on the translated and rotated model (e.g., that occlude their respective point on the model with respect to the perspective of a depth sensor that generated the depth information represented in the depth image). The first similarity metric could then be compared to a threshold proportion of image points, e.g., if more than 50% of the depth image points are within the threshold distance from their respective points on the translated and rotated model, the estimated pose could pass with respect to the first similarity metric. In another embodiment, the estimated pose could pass with respect to the first similarity metric if more than 50% of the depth image points are within the threshold distance from and do not occlude their respective points on the translated and rotated model.

Generating the second similarity metric includes generating a plurality of normal vectors from sets of points on the translated and rotated model (e.g., randomly sampled sets of points on the model, points that are proximate to each other on the model), generating a plurality of normal vectors from sets of image points of the depth image randomly sampled sets of image points, image points that are proximate to each other), generating a plurality of angles between the normal vectors generated from sets of points on the translated and rotated model and corresponding normal vectors generated from sets of image points of the depth image, and determining a proportion of the angles that are less than a threshold angle. Determining the second similarity metric could additionally include rejecting, from the determined proportion, those angles that correspond to image points that occlude their respective points on the translated and rotated model. The second similarity metric could then be compared to a threshold proportion of angles, e.g., if more than 50% of the determined angles are less than the threshold angle (e.g., less than 0.1 radian), the estimated pose could pass with respect to the second similarity metric.

Generating the third similarity metric includes determining a proportion of edges of the depth image (e.g., edges between adjacent or otherwise connected image points of the depth image) that are within an edge threshold distance from respective edges and/or back-projected points of the translated and rotated model. Determining the third similarity metric could additionally include rejecting, from the determined proportion, those edges of the depth image that occlude corresponding point(s) on the translated and rotated model (e.g., that occlude, with respect to the perspective of a depth sensor that generated the depth information represented in the depth image, points on the model that correspond to the endpoints of the edge). The third similarity metric could then be compared to a threshold proportion of edges, e.g., if more than 50% of the edges are within the edge threshold distance from their respective one or two points on the translated and rotated model, the estimated pose could pass with respect to the third similarity metric. In another embodiment, the estimated pose could pass with respect to the third similarity metric if more than 50% of the edges points are within the threshold distance from and do not occlude their respective one or two points on the translated and rotated model.

V. EXAMPLE SYSTEMS

Figure 4:
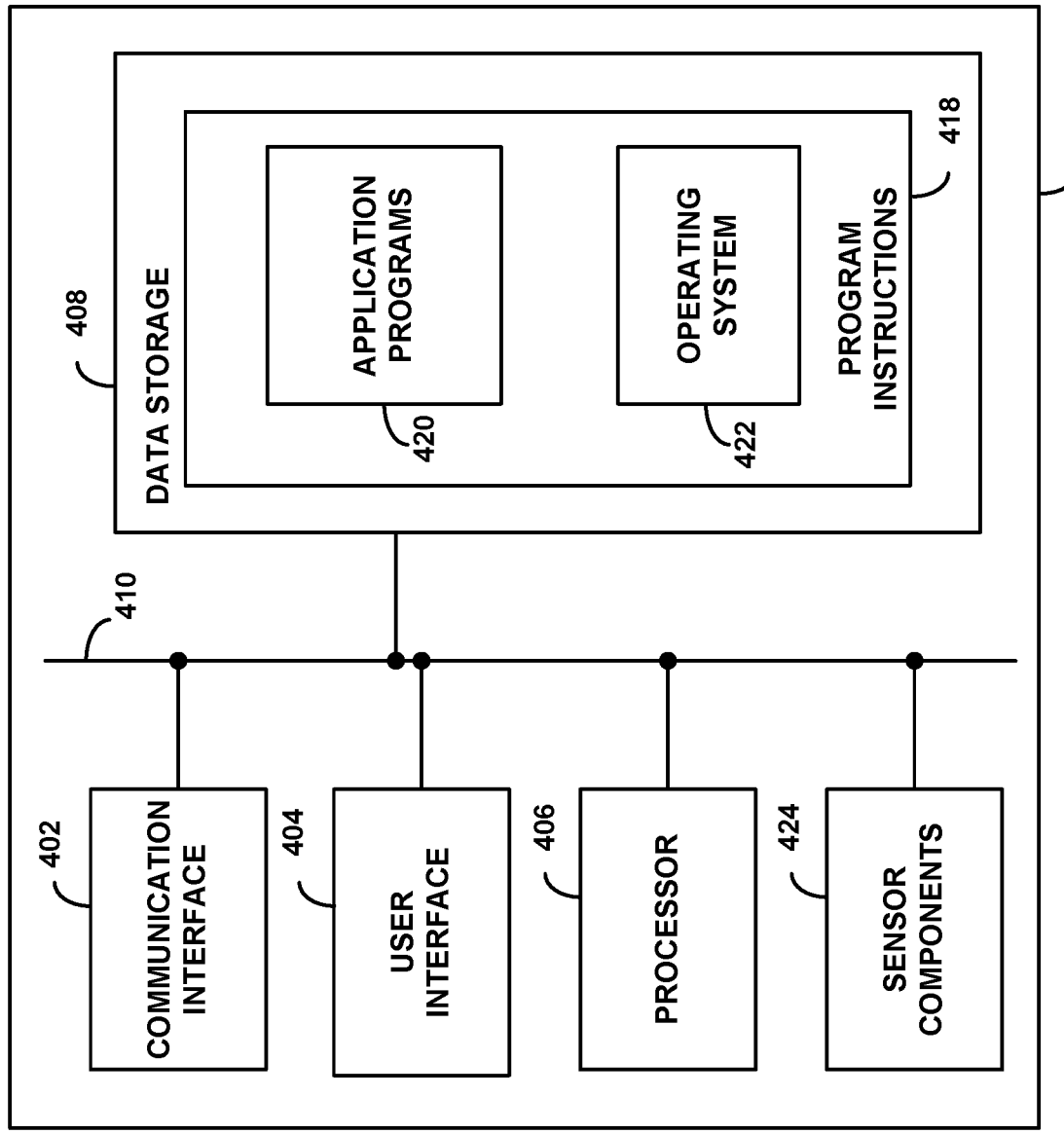
FIG. 4 is a simplified block diagram showing some of the components of an example computing system.

Computational functions (e.g., functions to estimate a pose for an object, to evaluate an estimated pose, to translate and rotate points of a depth image, to apply a decision tree, random forest, or other pose estimation algorithm) described herein may be performed by one or more computing systems. Such a computing system may be integrated into or take the form of a computing device, such as a mobile phone, tablet computer, laptop computer, server, home automation element, standalone video capture and processing device, cloud computing network, robot, drone, self-driving vehicle, camera, wearable display, and/or programmable logic controller. For purposes of example, FIG. 4 is a simplified block diagram showing some of the components of an example computing device 400 that may include depth sensor components 424. Depth sensor components 424 may include one or more cameras, such as visible light cameras, infrared cameras, light field cameras, plenoptic cameras, time-of-flight cameras, or other types of cameras, light emitters (e.g., one or more lasers, galvanometers or other components for controlling a direction of a laser), sound emitters, or other components configured to provide information sufficient to obtain a depth image of an environment.

Computing device 400 may be a wearable device or may include one or more wearable components. For example, the computing device 400 may include an augmented reality headset that includes an augmented reality display, depth sensor(s) (e.g., two or more cameras configure to provide stereo image information), or other components.

By way of example and without limitation, computing device 400 may be a cellular mobile telephone (e.g., a smartphone), a still camera, a video camera, a baby monitor, a home security camera, a robot, a drone, a self-driving vehicle, a computer (such as a desktop, notebook, tablet, or handheld computer), a personal digital assistant (PDA), a home automation component, a digital video recorder (DVR), a digital television, a wearable computing device, a wearable display, an augmented reality or virtual reality headset, or some other type of device that may be equipped with at some information processing capabilities. It should be understood that computing device 400 may represent a physical sensor device such a LIDAR module, a particular physical hardware platform on which an object pose estimation application operates in software, or other combinations of hardware and software that are configured to carry out pose estimation and/or object detection functions.

As shown in FIG. 4, computing device 400 may include a communication interface 402, a user interface 404, a processor 406, data storage 408, and depth sensor components 424, all of which may be communicatively linked together by a system bus, network, or other connection mechanism 410.

Communication interface 402 may function to allow computing device 400 to communicate, using analog or digital modulation of electric, magnetic, electromagnetic, optical, or other signals, with other devices, access networks, and/or transport networks. Thus, communication interface 402 may facilitate circuit-switched and/or packet-switched communication, such as plain old telephone service (POT'S) communication and/or Internet protocol (IP) or other packetized communication. For instance, communication interface 402 may include a chipset and antenna arranged for wireless communication with a radio access network or an access point. Also, communication interface 402 may take the form of or include a wireline interface, such as an Ethernet. Universal Serial Bus (USB), or High-Definition Multimedia Interface (HDMI) port. Communication interface 402 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 402. Furthermore, communication interface 402 may comprise multiple physical communication interfaces (e.g., a Wifi interface, a BLUETOOTH® interface, and a wide-area wireless interface).

In some embodiments, communication interface 42 may function to allow computing device 400 to communicate, with other devices, remote servers, access networks, and/or transport networks. For example, the communication interface 402 may function to transmit an indication of a the presence, location, orientation, or other information about objects present in an environment, as determined from a depth image or other depth information about the environment and/or to receive an indication of one or more depth images.

User interface 404 may function to allow computing device 400 to interact with a user, for example to receive input from and/or to provide output to the user. Thus, user interface 404 may include input components such as a keypad, keyboard, touch-sensitive or presence-sensitive panel, computer mouse, trackball, joystick, microphone, instrumented glove, force-feedback devices, and so on. User interface 404 may also include one or more output components such as haptic outputs, force-feedback outputs, or a display screen which, for example, may be an augmented reality screen that permits a user to also view the environment of the user through the display screen. The display screen may be based on CRT, LCD, and/or LED technologies, or other technologies now known or later developed. User interface 404 may also be configured to generate audible output(s), via a speaker, speaker jack, audio output port, audio output device, earphones, and/or other similar devices.

Processor 406 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, decision tree computation, rotation and/or translation of location information in three-dimensional space, template matching, and point projection, among other applications or functions. Data storage 408 may include one or more volatile and/or non-volatile storage components, such as magnetic, optical, flash, or organic storage, and may be integrated in whole or in part with processor 406. Data storage 408 may include removable and/or non-removable components.

Processor 406 may be capable of executing program instructions 418 (e.g., compiled or non-compiled program logic and/or machine code) stored in data storage 408 to carry out the various functions described herein. Therefore, data storage 408 may include a non-transitory computer-readable medium, having stored thereon program instructions that, upon execution by computing device 400, cause computing device 400 to carry out any of the methods, processes, or functions disclosed in this specification and/or the accompanying drawings.

By way of example, program instructions 418 may include an operating system 422 (e.g., an operating system kernel, device driver(s), and/or other modules) and one or more application programs 420 (e.g., depth sensor functions, pose estimation functions, pose evaluation functions) installed on computing device 400.

Application programs 420 may take the form of "apps" that could be downloadable to computing device 400 through one or more online application stores or application markets (via, e.g., the communication interface 402). However, application programs can also be installed on computing device 400 in other ways, such as via a web browser or through a physical interface (e.g., a USB port) of the computing device 400.

Depth sensor components 424 may include, but are not limited to, one or more cameras (e.g., visual, infrared, or ultraviolet cameras arranged, e.g., to provide stereo image information), time-of-flight sensors (e.g., visual or acoustical rangefinders, optical time-of-flight cameras), light emitters (e.g., one or more lasers) and/or means for controlling the direction of emitted light (e.g., one or more galvanometers) and/or the pattern of the emitted light (e.g., to provide a line, a grid, or some other patterned illumination), or other components for generating depth information for an environment. Depth sensor components 424 may be controlled at least in part by software executed by processor 406 (e.g., by application programs 420). Further, depth sensor components 424 may include multiple depth sensor systems, e.g., a stereo camera, a scanned laser rangefinder, and/or a time-of-flight camera. Depth sensor components 424 may generate depth image information in the form of a point cloud, a two-dimensional array of pixels each representing a respective distance/depth into the environment, or some other depth-related information that can be processed to provide a depth image for an environment.

VI. EXAMPLE METHODS

Figure 5:
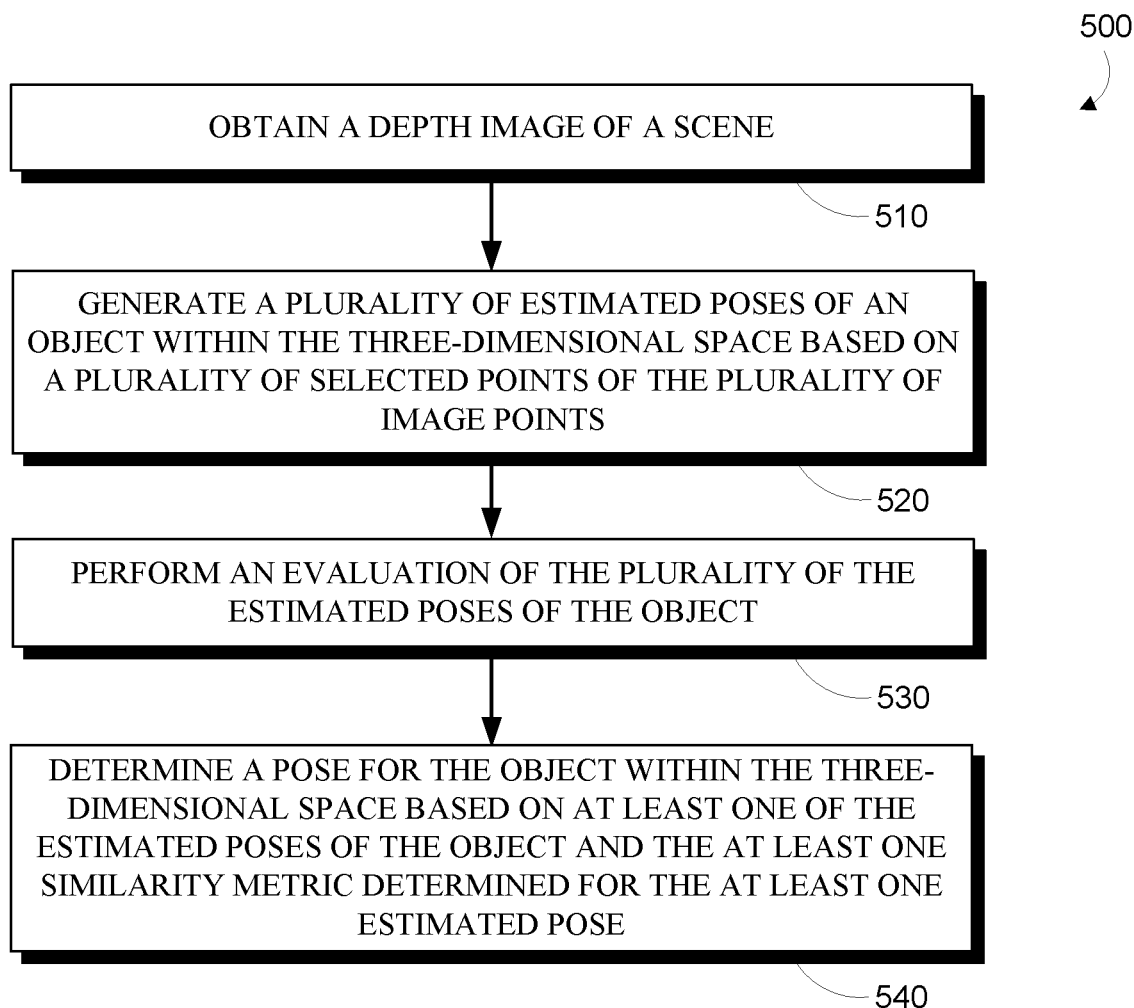
FIG. 5 is a flowchart of a method.

FIG. 5 is a flowchart of a method 500 for estimating a pose of an object based on a depth image. The method 500 includes obtaining a depth image of a scene (510). The depth image includes a plurality of image points within a three-dimensional space. The method 500 additionally includes generating a plurality of estimated poses of an object within the three-dimensional space based on a plurality of selected points of the plurality of image points (520). This includes, for each selected point: (i) rotating and translating the plurality of image points such that the selected point is centered within the three-dimensional space; and (ii) applying a random forest to the rotated and translated plurality of image points to generate an estimated pose of the object.

The method 500 additionally includes performing an evaluation of the plurality of the estimated poses of the object (530). The evaluation includes, for each estimated pose: (i) translating and rotating a model of the object according to the estimated pose; and (ii) comparing the translated and rotated model of the object to the image points of the depth image to determine at least one similarity metric for the estimated pose. The method 500 additionally includes determining a pose for the object within the three-dimensional space based on at least one of the estimated poses of the object and the at least one similarity metric determined for the at least one estimated pose (540). The method 500 could include additional elements or features.

Figure 6:
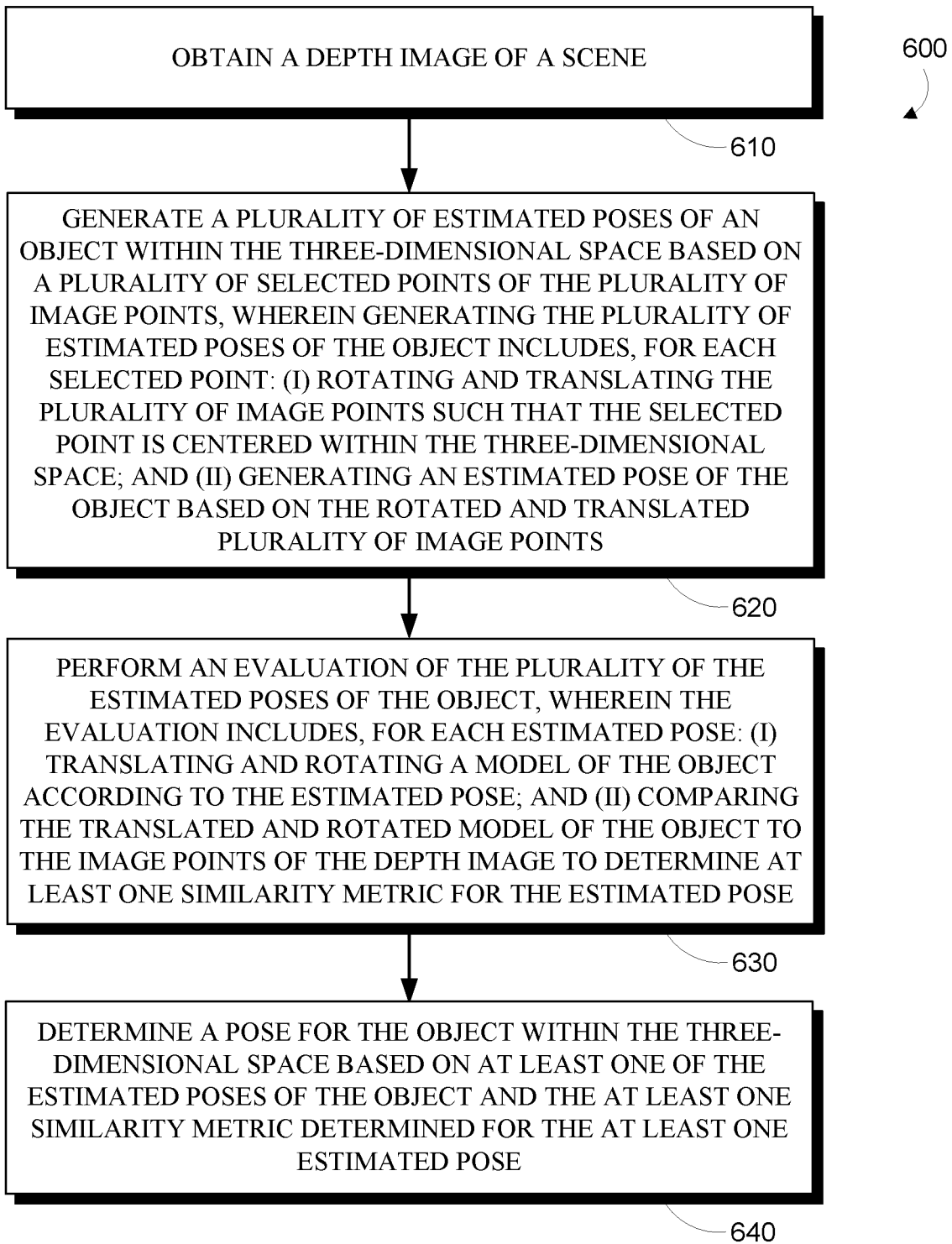
FIG. 6 is a flowchart of a method

FIG. 6 is a flowchart of a method 600 for estimating a pose of an object based on a depth image. The method 600 includes obtaining a depth image of a scene (610). The depth image includes a plurality of image points within a three-dimensional space. The method 600 also includes generating a plurality of estimated poses of an object within the three-dimensional space based on a plurality of selected points of the plurality of image points, wherein generating the plurality of estimated poses of the object includes, for each selected point: (i) rotating and translating the plurality of image points such that the selected point is centered within the three-dimensional space; and (ii) generating an estimated pose of the object based on the rotated and translated plurality of image points (620).

The method 600 additionally includes performing an evaluation of the plurality of the estimated poses of the object, wherein the evaluation includes, for each estimated pose: (i) translating and rotating a model of the object according to the estimated pose; and (ii) comparing the translated and rotated model of the object to the image points of the depth image to determine at least one similarity metric for the estimated pose (630). The method 600 additionally includes determining a pose for the object within the three-dimensional space based on at least one of the estimated poses of the object and the at least one similarity metric determined for the at least one estimated pose. The method 600 could include additional elements or features.

Figure 7:
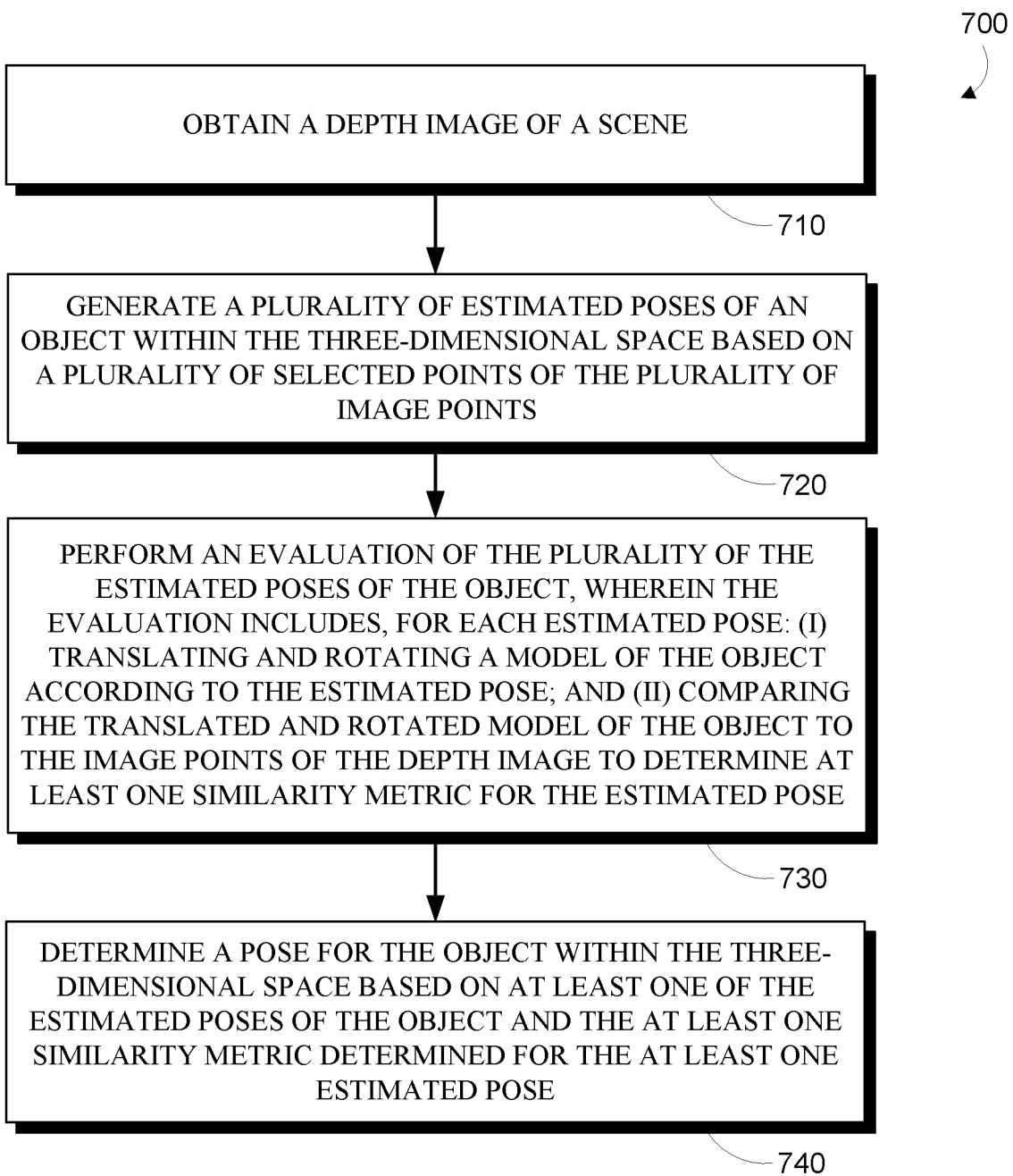
FIG. 7 is a flowchart of a method.

FIG. 7 is a flowchart of a method 700 for estimating a pose of an object based on a depth image. The method 700 includes obtaining a depth image of a scene (710). The depth image includes a plurality of image points within a three-dimensional space. The method 700 additionally includes generating a plurality of estimated poses of an object within the three-dimensional space based on a plurality of selected points of the plurality of image points (720). The method 700 also includes performing an evaluation of the plurality of the estimated poses of the object, wherein the evaluation includes, for each estimated pose: (i) translating and rotating a model of the object according to the estimated pose; and (ii) comparing the translated and rotated model of the object to the image points of the depth image to determine at least one similarity metric for the estimated pose (730). The method 700 additionally includes determining a pose for the object within the three-dimensional space based on at least one of the estimated poses of the object and the at least one similarity metric determined for the least one estimated pose (740). The method 700 could include additional elements or features.

Figure 8:
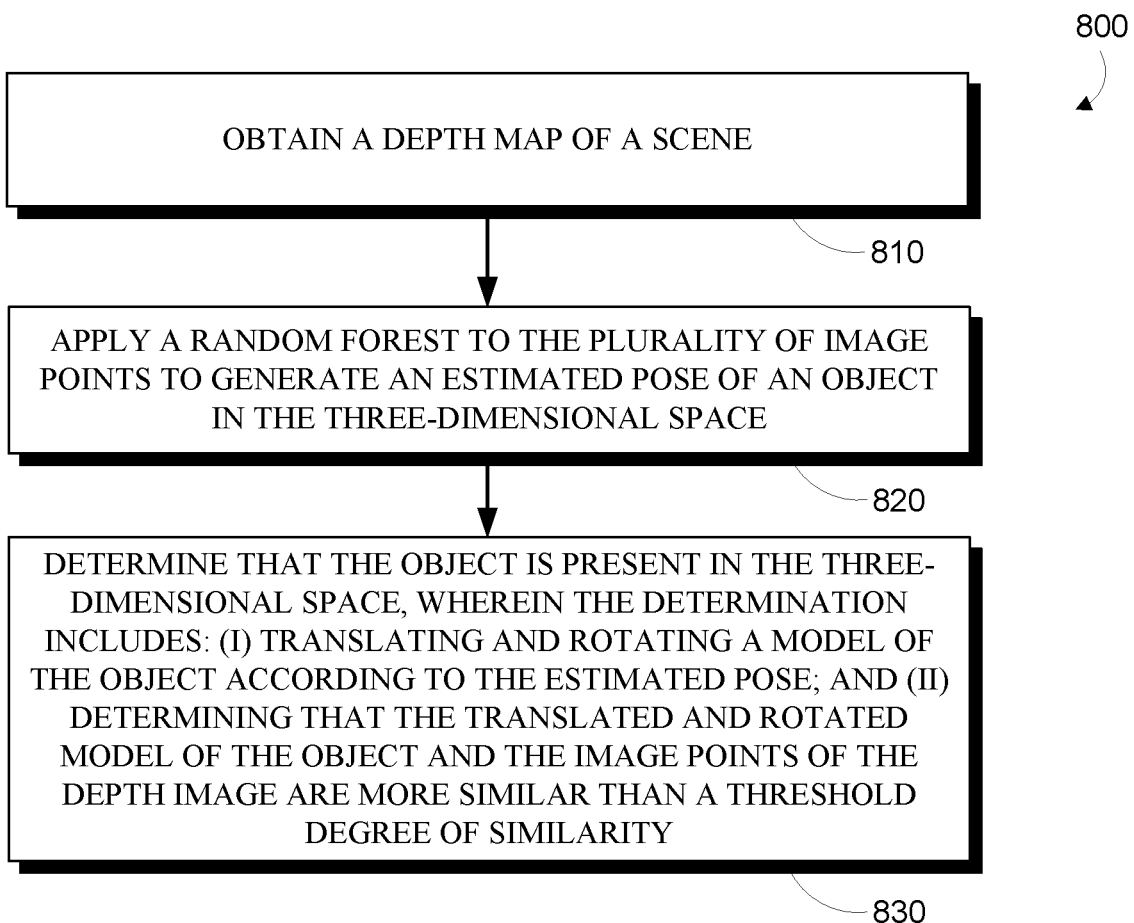
FIG. 8 is a flowchart of a method.

FIG. 8 is a flowchart of a method 800 for determining whether an object is present based on a depth image. The method 800 includes obtaining a depth image of a scene (810). The depth image includes a plurality of image points within a three-dimensional space. The method 800 additionally includes applying a random forest to the plurality of image points to generate an estimated pose of an object in the three-dimensional space (820). The method 800 also includes determining that the object is present in the three-dimensional space, wherein the determination includes: (i) translating and rotating a model of the object according to the estimated pose; and (ii) determining that the translated and rotated model of the object and the image points of the depth image are more similar than a threshold degree of similarity (830). The method 800 could include additional elements or features.

VII. CONCLUSION

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access Memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
obtaining a depth image of a scene, wherein the depth image comprises a plurality of image points within a three-dimensional space;
generating a plurality of estimated poses of an object within the three-dimensional space based on a plurality of selected points of the plurality of image points, wherein generating the plurality of estimated poses of the object comprises, for each selected point:
rotating and translating the plurality of image points such that the selected point is centered within the three-dimensional space; and
applying a random forest to the rotated and translated plurality of image points to generate an estimated pose of the object;
performing an evaluation of the plurality of estimated poses of the object, wherein the evaluation comprises, for each estimated pose:
translating and rotating a model of the object according to the estimated pose; and
comparing the translated and rotated model of the object to the image points of the depth image to determine at least one similarity metric for the estimated pose; and
determining a pose for the object within the three-dimensional space based on at least one of the estimated poses of the object and the at least one similarity metric determined for the at least one estimated pose.

2. The method of claim 1, further comprising:
applying the determined pose for the object by at least one of (i) generating an image of the object, wherein the image of the object includes an overlay based on the determined pose for the object, (ii) providing a command, based on the determined pose for the object, to a robot to interact with the object, or (iii) providing, to a user, a command to manipulate the object such that the object assumes a specified pose.

3. The method of claim 1, wherein the random forest comprises a plurality of regression trees.

4. The method of claim 3, wherein at least one of the regression trees of the plurality of regression trees generates, as an output, a six-dimensional estimated pose of the object.

5. The method of claim 3, wherein a first set of input features to a first regression tree of the plurality of regression trees differs from a second set of input features to a second regression tree of the plurality of regression trees.

6. The method of claim 1, wherein rotating and translating the plurality of image points such that the selected point is centered comprises applying a first rotation and translation to the plurality of image points, and wherein applying the random forest to the rotated and translated plurality of image points to generate the estimated pose of the object comprises:
  applying the random forest to the rotated and translated plurality of image points to generate a first pose estimate; and
  applying an inverse of the first rotation and translation to the first pose estimate.

7. The method of claim 1, wherein comparing the translated and rotated model of the object to the depth image to determine at least one similarity metric for the estimated pose comprises:
  generating three similarity metrics between the translated and rotated model of the object and the depth image;
  comparing the three similarity metrics to respective threshold values; and
  determining whether the translated and rotated model of the object corresponds to the depth image by determining whether all three similarity metrics exceeded their respective threshold values.

8. The method of claim 7, wherein generating three similarity metrics between the translated and rotated model of the object and the depth image comprises:
  generating a first similarity metric by determining a proportion of points on the translated and rotated model that are within a point threshold distance from respective image points of the depth image;
  generating a second similarity metric by (i) generating a plurality of normal vectors from sets of points on the translated and rotated model, (ii) generating a plurality of normal vectors from sets of image points of the depth image, (iii) generating a plurality of angles between the normal vectors generated from sets of points on the translated and rotated model and corresponding normal vectors generated from sets of image points of the depth image, and (iv) determining a proportion of the angles that are less than a threshold angle; and
  generating a third similarity metric by determining a proportion of edges of the translated and rotated model that are within an edge threshold distance from respective edges of the depth image.

9. The method of claim 1, wherein comparing the translated and rotated model of the object to the depth image to determine at least one similarity metric for the estimated pose comprises determining whether the translated and rotated model of the object and the depth image are more similar than a threshold degree of similarity, and wherein determining a pose for the object within the three-dimensional space based on at least one of the estimated poses of the object and the at least one similarity metric determined for the at least one estimated pose comprises determining that a particular one of the estimated poses of the object corresponds to a determined similarity metric that is greater than the threshold degree of similarity.

10. A method comprising:
  obtaining a depth image of a scene, wherein the depth image comprises a plurality of image points within a three-dimensional space;
  applying a random forest to the plurality of image points to generate an estimated pose of an object in the three-dimensional space; and
  determining that the object is present in the three-dimensional space by:
    translating and rotating a model of the object according to the estimated pose; and
    determining that the translated and rotated model of the object and the image points of the depth image are more similar than a threshold degree of similarity.

11. The method of claim 10, further comprising:
  applying the determined pose for the object by at least one of (i) generating an image of the object, wherein the image of the object includes an overlay based on the determined pose for the object, (ii) providing a command, based on the determined pose for the object, to a robot to interact with the object, or (iii) providing, to a user, a command to manipulate the object such that the object assumes a specified pose.

12. The method of claim 10, wherein the random forest comprises a plurality of regression trees.

13. The method of claim 12, wherein at least one of the regression trees of the plurality of regression trees generates, as an output, a six-dimensional estimated pose of the object.

14. The method of claim 12, wherein a first set of input features to a first regression tree of the plurality of regression trees differs from a second set of input features to a second regression tree of the plurality of regression trees.

15. The method of claim 10, wherein determining that the translated and rotated model of the object and the depth image are more similar than a threshold degree of similarity comprises:
  generating three similarity metrics between the translated and rotated model of the object and the depth image;
  comparing the three similarity metrics to respective threshold values; and
  determining that all three similarity metrics exceed their respective threshold values.

16. The method of claim 15, wherein generating three similarity metrics between the translated and rotated model of the object and the depth image comprises:
  generating a first similarity metric by determining a proportion of points on the translated and rotated model that are within a point threshold distance from respective image points of the depth image;
  generating a second similarity metric by (i) generating a plurality of normal vectors from sets of points on the translated and rotated model, (ii) generating a plurality of normal vectors from sets of image points of the depth image, (iii) generating a plurality of angles between the normal vectors generated from sets of points on the translated and rotated model and corresponding normal vectors generated from sets of image points of the depth image, and (iv) determining a proportion of the angles that are less than a threshold angle; and
  generating a third similarity metric by determining a proportion of edges of the translated and rotated model that are within an edge threshold distance from respective edges of the depth image.

17. An article of manufacture including a non-transitory computer-readable medium, having stored thereon program instructions that, upon execution by a computing device, cause the computing device to perform computing operations comprising:
  obtain a depth image of a scene, wherein the depth image comprises a plurality of image points within a three-dimensional space;
  apply a random forest to the plurality of image points to generate an estimated pose of an object in the three-dimensional space; and
  determine that the object is present in the three-dimensional space by:
    translating and rotating a model of the object according to the estimated pose; and determining that the translated and rotated model of the object and the image points of the depth image are more similar than a threshold degree of similarity.

18. The article of manufacture of claim 17, wherein the random forest comprises a plurality of regression trees, and wherein a first set of input features to a first regression tree of the plurality of regression trees differs from a second set of input features to a second regression tree of the plurality of regression trees.

19. The article of manufacture of claim 17, wherein determining that the translated and rotated model of the object and the depth image are more similar than a threshold degree of similarity comprises:
   generating three similarity metrics between the translated and rotated model of the object and the depth image;
   comparing the three similarity metrics to respective threshold values; and
   determining that all three similarity metrics exceed their respective threshold values.

20. The article of manufacture of claim 19, wherein generating three similarity metrics between the translated and rotated model of the object and the depth image comprises:

generating a first similarity metric by determining a proportion of points on the translated and rotated model that are within a point threshold distance from respective image points of the depth image;

generating a second similarity metric by (i) generating a plurality of normal vectors from sets of points on the translated and rotated model, (ii) generating a plurality of normal vectors from sets of image points of the depth image, (iii) generating a plurality of angles between the normal vectors generated from sets of points on the translated and rotated model and corresponding normal vectors generated from sets of image points of the depth image, and (iv) determining a proportion of the angles that are less than a threshold angle; and generating a third similarity metric by determining a proportion of edges of the translated and rotated model that are within an edge threshold distance from respective edges of the depth image.

* * * * *